United States Patent [19]

Pauley et al.

[11] Patent Number: 4,728,276

[45] Date of Patent: Mar. 1, 1988

[54] UNDERWATER PELLETIZER

[75] Inventors: General J. Pauley, Daleville; Donald W. Smith, Troutville, both of Va.; Dennis M. Chaney, Scott Depot, W. Va.; Samuel F. Hannah, Eagle Rock; J. Wayne Martin, Buchanan, both of Va.

[73] Assignee: Gala Industries, Inc., Eagle Rock, Va.

[21] Appl. No.: 824,645

[22] Filed: Jan. 31, 1986

[51] Int. Cl.⁴ ............................................. B29C 47/00
[52] U.S. Cl. ..................................... 425/67; 264/142; 425/311; 425/313
[58] Field of Search ............... 384/453, 537, 519, 540, 384/906; 425/67, 69, 142, 196, 310, 311, 313, 315, 463, 464; 264/28, 178 F, 178 R, 141, 142

[56] References Cited

U.S. PATENT DOCUMENTS

| | | | |
|---|---|---|---|
| 2,178,431 | 10/1939 | Orr | 425/313 |
| 2,473,267 | 6/1949 | Wightmann | 384/537 |
| 2,550,908 | 5/1951 | Bryant et al. | 384/453 |
| 3,230,582 | 1/1966 | Hoffman et al. | 425/67 |
| 3,287,764 | 11/1966 | Swickard, Jr. et al. | 425/311 |
| 3,317,957 | 5/1967 | Heston et al. | 425/67 |
| 3,355,767 | 12/1967 | Niemeyer | 425/313 |
| 3,516,120 | 6/1970 | Braun et al. | 425/67 |
| 3,792,950 | 2/1974 | Cuff | 425/313 |
| 3,912,332 | 10/1975 | Jones | 384/537 |
| 3,912,434 | 10/1975 | Nagahara et al. | 425/142 |
| 4,123,207 | 10/1978 | Dudley | 425/67 |
| 4,150,595 | 4/1979 | Loffler et al. | 425/313 |
| 4,179,255 | 12/1979 | Hale | 425/67 |
| 4,182,605 | 1/1980 | Dettmer | 425/311 |
| 4,184,833 | 1/1980 | Buchan et al. | 425/313 |
| 4,249,879 | 2/1981 | Anders et al. | 264/142 |
| 4,321,026 | 3/1982 | Lambertus | 425/142 |
| 4,461,737 | 7/1984 | Voss | 425/142 |
| 4,500,271 | 2/1985 | Smith | 425/311 |
| 4,529,370 | 7/1985 | Holmes et al. | 425/142 |

FOREIGN PATENT DOCUMENTS 58-211016 12/1983 Japan .................................. 384/453

Primary Examiner—Jay H. Woo
Assistant Examiner—J. Fortenberry
Attorney, Agent, or Firm—Fleit, Jacobson, Cohn & Price

[57] ABSTRACT

An underwater pelletizer providing more efficient formation of uniform size pellets including the provision of a taper on the die holes so that polymer will freeze near the exit and form an insulated die hole and a resultant cylindrical die hole for smooth polymer flow, axially movable ball bearing assemblies to support the pelletizer shaft in a housing, a threaded assembly with a thrust bearing to axially adjust the pelletizer shaft for compensating for blade wear, radial clearance for the outer race of the thrust bearing to eliminate preloading of the axially movable ball bearings, a gear coupling between the shaft and driving motor to permit axial movement of the shaft for blade adjustment, and a spring support for the pelletizer, all of which cooperate to form an effective underwater pelletizer which will efficiently produce uniform plastic pellets.

7 Claims, 4 Drawing Figures

UNDERWATER PELLETIZER

BACKGROUND OF THE INVENTION

1. Field of the Invention

The present invention generally relates to underwater pelletizers and more specifically to improved features incorporated into an underwater pelletizer for providing more efficient formation of uniform size pellets including the provision of a taper on the die holes so that polymer will freeze near the exit and form an insulated die hole and a resultant cylindrical die hole for smooth polymer flow, axially movable ball bearing assemblies to support the pelletizer shaft in a housing, a threaded assembly with a thrust bearing to axially adjust the pelletizer shaft for compensating for blade wear, radial clearance for the outer race of the thrust bearing to eliminate preloading of the axially movable ball bearings, a gear coupling between the shaft and driving motor to permit axial movement of the shaft for blade adjustment, and a spring support for the pelletizer, all of which cooperate to form an effective underwater pelletizer which will efficiently produce uniform plastic pellets.

2. Information Disclosure Statement

Underwater pelletizers have been used for a number of years and basically include an extrusion die with multiple die holes with a cutter severing extruded polymer into pellets with the cutting operation being underwater. While such underwater pelletizers have been used for a number of years, such devices have been the subject of various developments and improvements.

SUMMARY OF THE INVENTION

An object of the present invention is to provide an underwater pelletizer utilizing axially movable ball bearing assemblies supporting a cutter blade assembly and a shaft from a housing to enable axial movement of the shaft to compensate for blade wear during rotation of the blade assembly in relation to an extrusion die plate.

Another object of the invention is to provide an underwater pelletizer in accordance with the preceding object that includes a threaded assembly with a thrust bearing to adjust the pelletizer shaft and blade assembly to compensate for blade wear with the thrust bearing associated with the threaded assembly including radial clearance in relation to a supporting housing to permit lateral movement of the thrust bearing so the axially movable supporting ball bearings will not be preloaded.

A further object of the invention is to provide a gear coupling between the pelletizer shaft and the drive motor to permit axial movement of the shaft for blade adjustment.

Still another object of the invention is to provide an underwater pelletizer supported by a spring support assembly enabling the pelletizer to float on the end of the extruder barrel to prevent stresses and misalignment due to thermal expansion of the extruder barrel with the spring assembly including individually adjustable springs.

A still further object of the invention is to provide an underwater pelletizer in accordance with the preceding objects in which the die holes in the extrusion die plate are tapered outwardly at their exit end so that as polymer freezes next to the exit, it will form an insulated die hole thereby forming a desired thermal barrier with the freezing of the polymer in the outwardly tapering exit end of the die hole also providing a final cylindrical shape to the hole for smooth polymer flow thereby producing more uniform pellets and eliminating non-uniform pellets and premature freeze off.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
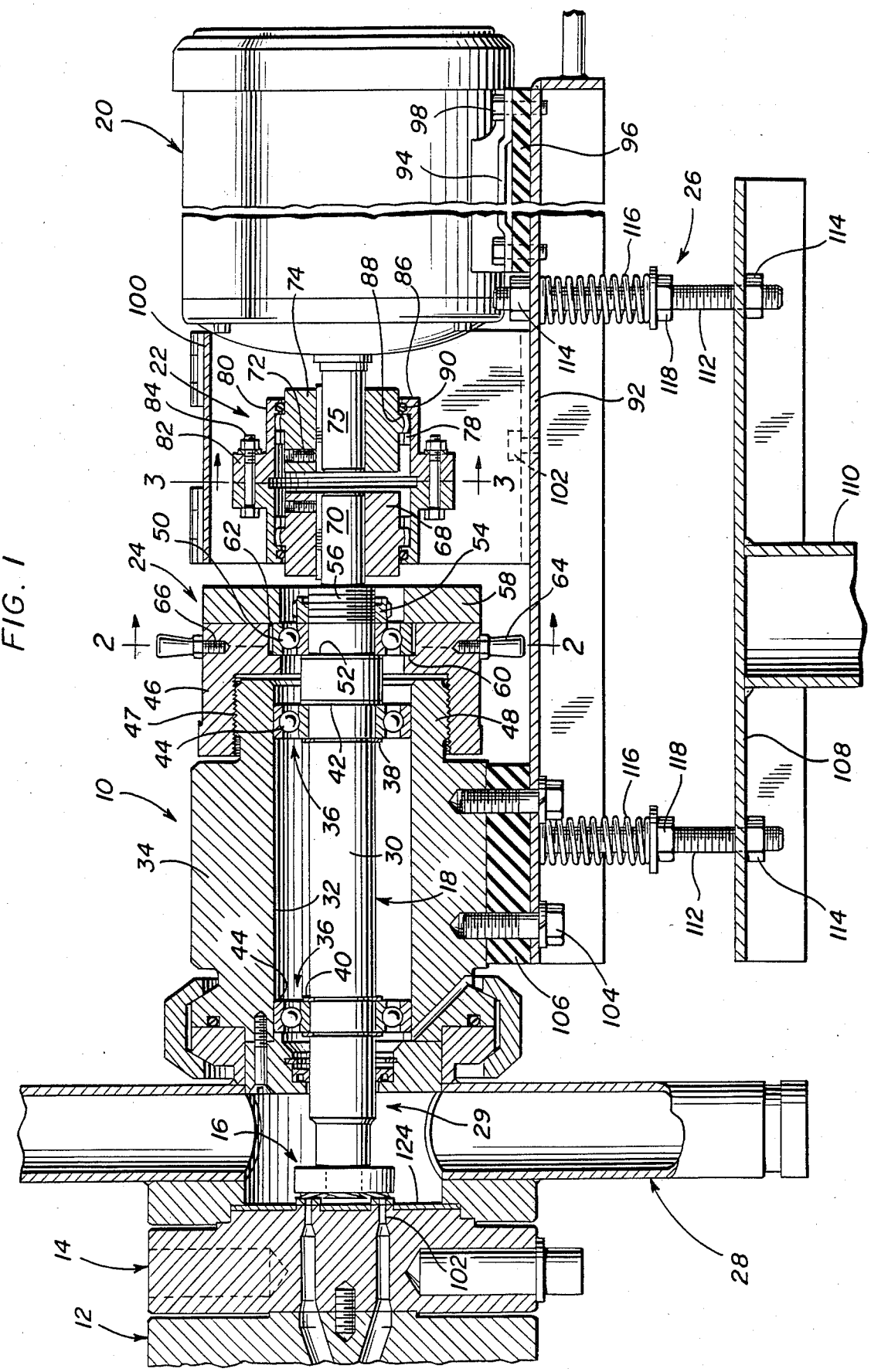
FIG. 1 is a sectional view of the underwater pelletizer of the present invention illustrating the novel features incorporated therein.
Figure 2:
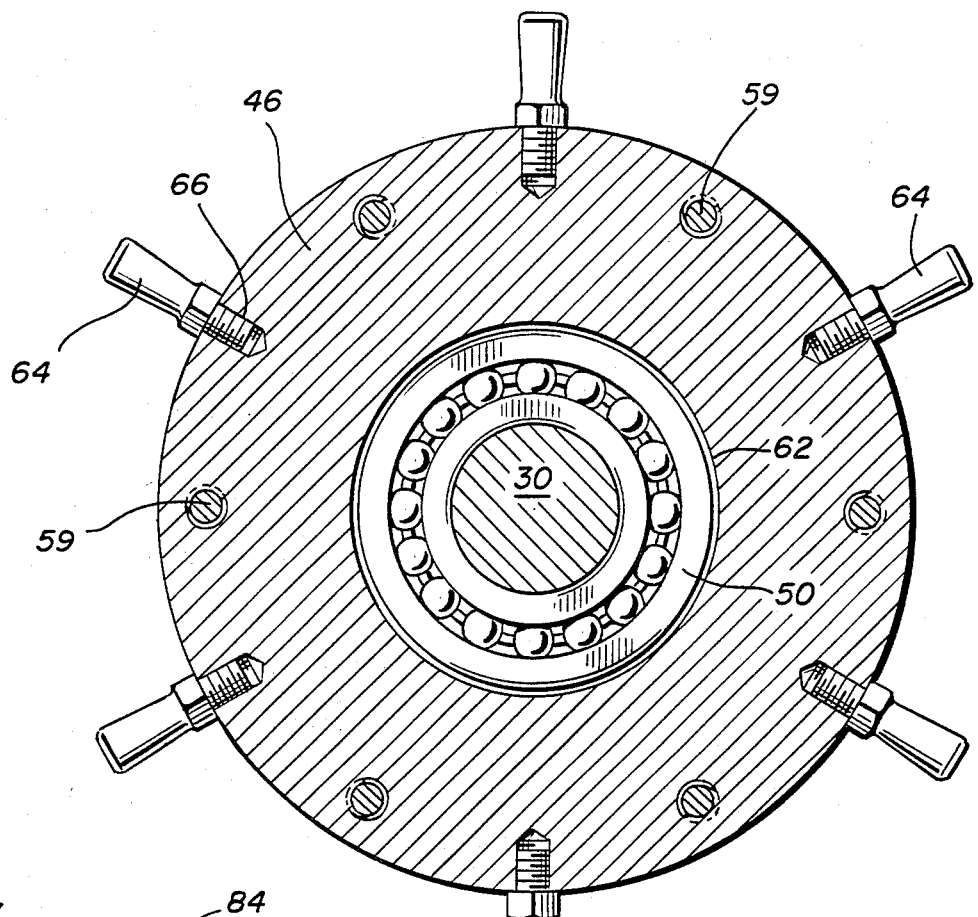
FIG. 2 is a transverse, sectional view, on an enlarged scale, taken substantially upon a plane passing along section line 2—2 on FIG. 1 illustrating the threaded assembly and thrust bearing for adjusting the shaft axially.
Figure 3:
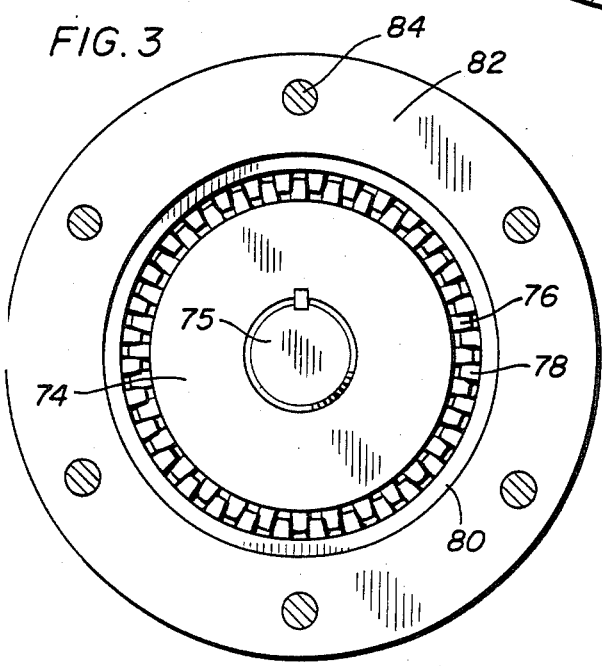
FIG. 3 is a transverse, sectional view, on an enlarged scale, taken substantially upon a plane passing along section line 3—3 on FIG. 1 illustrating structural details of the gear coupling.

Referring now specifically to FIG. 1, the underwater pelletizer of the present invention is generally designated by reference numeral 10 and includes a transition device 12 including a die plate 14 associated with a cutting blade assembly 16 similar to the structure disclosed in U.S. Pat. No. 4,251,198 issued Feb. 17, 1981 supported and driven by a shaft assembly 18 drivingly connected to a motor 20 through a coupling 22 with the position of the cutting blade assembly being adjusted by an adjustment mechanism 24 and a support structure 26 is provided for supporting the motor, shaft assembly and cutting blade assembly. A water circulating passageway assembly 28 is provided for supplying water to a water box or container 29 enclosing the cutter blade assembly 16 and the die face on the die plate 14. Previously known underwater pelletizers include similar basic arrangements but unique features are incorporated into the present invention with specific unique features being incorporated into the supporting and adjustment structure for the shaft assembly 18, the coupling 22, the support structure 26 and the die plate 14.

The shaft assembly 18 includes a generally cylindrical elongated rigid shaft member 30 oriented axially within the hollow interior 32 of a housing 34 with the shaft member 30 being rotatably supported by a pair of longitudinally spaced ball bearing assemblies 36 each of which includes an inner race 38 secured to the shaft member 30 in an immovable manner such as by retaining rings 40 securing the bearing assembly 36 remote from the motor 20 and a retaining ring 40 and shoulder 42 on the shaft member 30 securing the outer bearing assembly 36 to the shaft member 30. The retaining rings 40 and shoulder 42 secure the inner races 38 of the ball bearing assemblies 36 longitudinally on the shaft member 30. However, the outer races 44 of the ball bearing assemblies 36 are axially slidably or movably disposed in the hollow interior 32 of the housing 34 so that the drive shaft assembly including the cutter blade assembly 16 may be adjusted axially of the housing 34 and the die plate 14 to adjust the position of the cutting blade assembly and compensate for wear.

The adjustment assembly 24 for axially adjusting the shaft assembly 18 includes an internally threaded cup-shaped member 46 which is in screw threaded engagement at 47 with an externally threaded reduced portion 48 on the housing 34. The cup-shaped member 46 encircles the shaft member 30 and a thrust bearing 50 interconnects the cup-shaped member 46 and the shaft member 30 with the inner race of the thrust bearing 50 engaging a shoulder 52 on the shaft member 30 and being retained against the shoulder 52 by a threaded nut 54 threaded onto a threaded portion 56 of the shaft member 30 to prevent axial movement of the thrust bearing 50 on the shaft member 30. A retaining plate 58 is mounted against the end of the cup-shaped member 46 remote from the threaded engagement with the housing by suitable bolts, cap screws 59 or the like with the retaining plate 58 having an inner opening which overlaps and engages the outer race of the thrust bearing 50 so that the outer race of the thrust bearing 50 is precluded from axial movement in relation to the cup-shaped member 46 by engagement with the retaining plate 58 and a forward shoulder 60 formed in the interior surface of the cupshaped member 46. As illustrated in FIG. 1, the outer race of the thrust bearing 50 is provided with radial clearance 62 between the outer circumference of the outer race of the thrust bearing 50 and the interior of the recess in the cup-shaped member 46 which receives the outer race of the thrust bearing 50. This permits lateral movement of the thrust bearing so that it will not preload the alignment bearings 36 for the shaft assembly 18. The periphery of the cup-shaped member 46 is provided with a plurality of radially extending knobs or handles 64 having a screw threaded connection 66 with internally threaded sockets or recesses formed in the periphery of the cup-shaped member 46 thereby enabling the cup-shaped member to be rotated about the axis of the shaft member 30. In effect, the cup-shaped member 46 is an adjustment nut that retains the thrust bearing 50 captive axially so that axial thrust can be exerted on the shaft assembly 18 in either direction with the radial clearance 62 enabling lateral movement of the thrust bearing 50 so that it will not introduce a preload into the alignment ball bearings 36 which permanently align the shaft member 30 in relation to the die plate and housing.

The coupling 22 includes a hub 68, secured to the reduced end 70 of shaft member 30 by a suitable key-and-set screw arrangement 72. A similar hub 74 is secured to the output shaft 75 of the motor 20 in a similar manner with the reduced end 70 of the shaft member 30 being generally in alignment with the motor output shaft 75 and spaced therefrom with the hubs 68 and 74 also being in spaced aligned relation as illustrated in FIG. 1. The external surface of each of the hubs 68 and 74 has gear teeth 76 thereon for axial sliding engagement with internal gear teeth 78 on coupling members 80 each of which includes an outwardly extending flange 82 with the flanges being secured by fastening bolts 84. This structure permits relative axial movement between the hubs 68 and 74 and the reduced end 70 of shaft member 30 and the output shaft 75 from motor 20 while maintaining a driving connection therebetween. Each of the sleeve-like coupling members 80 is provided with an inwardly extending flange 86 engaged with a shoulder 88 on the respective hub to limit the outward movement of the hubs in relation to retain the coupling members 80 and an O-ring seal 90 is provided between the inner edge of the flange 86 and the exterior surface of the respective hubs to the coupling lubricant therein. This structure enables limited relative movement between the output shaft 75 of the motor 20 and the shaft member 30 thereby eliminating axial and radial forces from being transmitted to the shaft member 30 from the motor output shaft 75. The structure of the coupling 22 per se is known and is commercially available. However, the concept of employing a coupling which compensates for both parallel and angular misalignment as well as end float is unique in driving the shaft assembly 18 in a pelletizer.

The support assembly 26 includes a support plate 92 which has the motor 20 attached thereto through a base plate 94 on the motor 20, a resilient pad 96 and fastening bolts 98. Also attached to the support plate 92 is a protective housing or enclosure 100 for the coupling 22 to prevent accidental contact with the rotating components. The protective enclosure or housing 100 is secured to the support plate 92 by bolts 102. Also, the housing 34 is secured to the support plate 92 by fastening bolts 104 with the resilient pad 106 interposed between the support plate 92 and the housing 34. Positioned below the support plate 92 and supporting the support plate 92 is a support platform or base 108 supported in any suitable manner such as from a pedestal 110. The support plate 92 is adjustably supported from the base 108 by a plurality of externally threaded bolts 112 having a nut 114 on each end with one nut being above the plate 92 and the other nut being below the platform or base 108. A compression coil spring 116 is positioned on the bolt 112 with the upper end thereof engaging the under surface of the support plate 92 and the lower end engaged with an adjustment nut 118 on the bolt 112. Four or more bolts 112 are provided between the support plate 92 and the platform or base 108 so that by adjustment of the nuts 118, the pelletizer can be supported in a manner that it floats in relation to the end of the extruder barrel to prevent stresses and misalignment due to thermal growth of the extruder barrel supports. The individual adjustment of the springs 116 by the adjustment nuts 118 enables proper tensioning of springs 116. Accurate resilient positioning of the pelletizer components in relation to the die plate 14 and transition 12 is accomplished by adjusting bolts 112.

Figure 4:
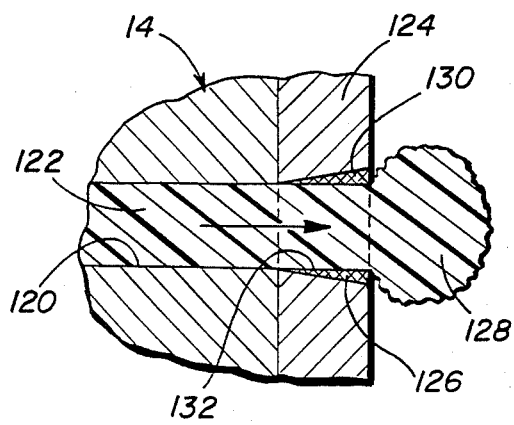
FIG. 4 is an enlarged fragmental sectional view illustrating the outward taper on the exit portion of the die hole with the frozen polymer therein forming a residual cylindrical-shaped hole.

FIG. 4 illustrates another feature of the underwater pelletizer of the present invention in which the die plate 14 includes the usual passageways 120 for flow of molten polymer 122 in the form of a strand or ribbon in a conventional manner. The die plate 14 includes a die face member 124 having an outwardly tapering exit passageway or hole 126 from which the polymer 122 exits and solidifies to form a pellet 128 which is cut off by the cutting blade assembly in a well known manner. If the exit hole is cylindrical, there is a solidification or freezing of the polymer on the interior thereof which causes a constriction in the flow path of the polymer with the constriction being at the exit of the die hole which reduces the cross-sectional area of the passageway and forms a constriction at the exit which is believed to cause non-uniform pellets and premature freeze off. The outwardly tapered exit hole 126 of the present invention does not prevent the freezing of polymer but the freezing of a polymer layer 130 forms an insulated die hole so that the final shape of the die hole will be cylindrical as designated by numeral 132. The solidified polymer 130 forms an insulating layer of very low thermal conductivity and provides an excellent thermal barrier so that only the tapered portion of the exit hole 126 will be filled with solidified polymer so that the residual hole 132 will be substantially cylindrical and will remain substantially cylindrical due to the insulation characteristics of the frozen polymer 130. Thus, the final cylindrical shape hole will produce more uniform pellets and prevent premature freeze off.

The unique features incorporated into the underwater pelletizer results in more efficient production of plastic pellets of uniform size and shape with the housing and shaft of the pelletizer being constructed for alignment with the polymer extrusion device with the axial movement of the supporting ball bearing assemblies providing axial movement of the shaft for compensating for blade wear and for adjustment of the blade. The thrust bearing and threaded cup-shaped member and related structure provides for axial adjustment of the shaft and cutting blade assembly and the gear coupling between the shaft and motor provides for adjustment and alignment of the components. The spring support structure enables the pelletizer to float on the end of the extruder barrel and prevents stresses and misalignment due to thermal expansion of the extruder device with the supporting springs being individually adjustable for accurate support of the pelletizer. The tapered configuration of the exit of the die holes results in polymer freezing to change the tapered configuration of the holes to cylindrical configuration with the solidified polymer providing a thermal barrier and the resultant cylindrical shaped holes providing for smooth polymer flow to produce more uniform pellets and to preclude premature freeze off.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In an underwater pelletizer having a housing, a rotatable shaft supported in the housing, means driving the shaft and a cutter blade assembly on one end of the shaft for association with an extrusion die plate for cutting extruded polymer into pellets, the improvement comprising bearing means supporting the shaft for axial adjustment, means interconnecting the shaft and housing for adjusting the shaft axially, said drive means including an output shaft member in axial alignment with the outer end of said shaft, and a coupling between the shaft and the output shaft member of said drive means enabling axial adjustment of the shaft for adjusting the cutting blade assembly and enabling compensation for blade wear, said bearing means supporting the shaft from the housing including a pair of spaced ball bearing assemblies spaced axially from said adjustment means, each ball bearing assembly including an inner race secured to the shaft in a manner to prevent relative axial movement therebetween, said housing including a hollow interior engaging the outer race of the ball bearing assemblies in a manner to enable axial movement of the outer race of the ball bearing assemblies in relation to the housing thereby enabling the shaft to be adjusted axially, said means to axially adjust the shaft including a thrust bearing having an inner race securely mounted on the shaft in a manner to prevent relative axial movement between the inner race of the thrust bearing and shaft, said thrust bearing being located adjacent the coupling and spaced axially from the ball bearing assemblies, the outer race of the thrust bearing being mounted in a cup-shaped member in a manner to prevent relative axial movement between the outer race of the thrust bearing and the cup-shaped member, said cup-shaped member being screw threadedly connected to the housing to move the cup-shaped member axially in response to rotation thereof with axial movement of the cup-shaped member causing axial movement of the thrust bearing and shaft.

2. In an underwater pelletizer having a housing, a rotatable shaft supported in the housing, means driving the shaft and a cutter blade assembly on one end of the shaft for association with an extrusion die plate for cutting extruded polymer into pellets, the improvement comprising bearing means supporting the shaft for axial adjustment, means interconnecting the shaft and housing for adjusting the shaft axially, said drive means including an output shaft member in axial alignment with the other end of said shaft, and a coupling between the shaft and the output shaft member of said drive means enabling axial adjustment of the shaft for adjusting the cutting blade assembly and enabling compensation for blade wear, said bearing means supporting the shaft from the housing including a pair of spaced ball bearing assemblies spaced axially from said adjustment means, each ball bearing assembly including an inner race secured to the shaft in a manner to prevent relative axial movement therebetween, said housing including a hollow interior engaging the outer race of the ball bearing assemblies in a manner to enable axial movement of the outer race of the ball bearing assemblies in relation to the housing thereby enabling the shaft to be adjusted axially, said means to adjust the shaft including a thrust bearing having an inner race securely mounted on the shaft adjacent the coupling and spaced axially from the ball bearing assemblies, the outer race of the thrust bearing being received in a cup-shaped member having a screw threaded connection with the housing to enable axial movement thereof with axial movement of the cup-shaped member causing axial movement of the thrust bearing and shaft, said thrust bearing including an outer race mounted in a recess in the cup-shaped member with radial clearance therebetween to enable lateral movement of the thrust bearing in relation to the cup-shaped member to avoid exertion of lateral force on the shaft.

3. The underwater pelletizer as defined in claim 2 wherein said drive means includes a motor, said output shaft member aligned with the shaft extending from the motor and connected to the cutting blade assembly, said coupling including a hub on each of the shaft and output shaft member with the exterior of each hub including gear teeth thereon, a split coupling member in the form of sleeves having internal gear teeth engaged with the gear teeth on the hub with the sleeves being secured together and the internal gear teeth logitudinally slidably engaged with the gear teeth on the hubs to enable relative axial movement between the motor output shaft member and the shaft having the cutter blade assembly thereon.

4. The underwater pelletizer as defined in claim 2 wherein the die plate includes an exit hole having an outwardly tapering surface for passage of molten polymer with a portion of the molten polymer freezing on the tapered surface and converting the tapered surface into a cylindrical exit hole when the solidified polymer fills the tapered area of the exit hole with the solidified polymer providing a thermal insulation barrier to retain the resultant hole generally cylindrical in configuration.

5. The underwater pelletizer as defined in claim 2 wherein said housing and drive means are supported resiliently from a support plate, a support platform underlying said support plate, and a plurality of independently adjustable spring support members interconnecting said support plate and support platform.

6. The underwater pelletizer as defined in claim 3 wherein the die plate includes an exit hole having an outwardly tapering surface for passage of molten polymer with a portion of the molten polymer freezing on the tapered surface and converting the tapered surface into a cylindrical exit hole when the solidified polymer fills the tapered area of the exit hole with the solidified polymer providing a thermal insulation barrier to retain the resultant hole generally cylindrical in configuration.

7. The underwater pelletizer as defined in claim 6 wherein said housing and drive means are supported resiliently from a support plate, a support platform underlying said support plate, and a plurality of independently adjustable spring support members interconnecting said support plate and support platform.

* * * * *